United States Patent Office 3,397,955
Patented Aug. 20, 1968

3,397,955
PURIFICATION OF PHOSPHORIC ACID DERIVED FROM PHOSPHATE ROCK
Roger Champ, Bourg-la-Reine, Michel Martin, Paris, and Louis Winand, Creteil, France, assignors of fifty percent to Produits Chimiques Pechiney-Saint-Gobain, Neuilly-sur-Seine, France, and fifty percent to Union Chimique Chemische Bedrijven, Brussels, Belgium
No Drawing. Filed Jan. 4, 1966, Ser. No. 518,525
Claims priority, application France, Jan. 5, 1965, 873
12 Claims. (Cl. 23—165)

ABSTRACT OF THE DISCLOSURE

A process for the purification of phosphoric acid by means of solvent extraction from an impure phosphoric acid solution derived from the treatment of phosphate rock with phosphoric acid in which addition is made of boron ions to the impure phosphoric acid solution in amount sufficient to prevent formation of gelatinous silica, extracting the impure phosphoric acid solution with a water immiscible organic solvent in which the phosphoric acid is soluble and which extracts the phosphoric acid from the impure phosphoric acid solution, and then contacting the water immiscible organic solvent having the phosphoric acid dissolved therein with water to extract purified phosphoric acid from the immiscible organic solvent.

This invention relates to the purification of phosphoric acid obtained by the treatment of natural phosphate rock with sulphuric acid and it relates more particularly to a process for the extraction of purified phosphoric acid by means of a solvent separation system which makes use of a water immiscible organic solvent.

The extraction of phosphoric acid from phosphate rock has become a very important industry. Extraction by solubilization is achieved by treatment of the rock with sulphuric acid to produce a slurry containing the impure phosphoric acid which normally finds use as a fertilizer component. It would be desirable to be able to effect separation of a purified phosphoric acid from such slurry for use of the purified phosphoric acid in applications which are now limited to phosphoric acid that is obtained by the combustion of phosphorus.

Suggestions have been made over a long period of time for purification of the impure phosphoric acid in the slurry by means of solvent extraction. Numerous difficulties and problems have been encountered in the attempt to reduce the process to commercial practice. Such difficulties stem, in part, from the formation and accumulation of gelatinous silica which interferes with the flow of fluids and the ability to conduct the type of continuous operation essential for commercial practice.

It is an object of this invention to produce and to provide a method for producing a purified phosphoric acid from the slurry formed in the treatment of phosphate rock with sulphuric acid and it is a related object to provide a method and means which makes use of the expenditure of a minimum amount of material; which reduces the formation of gelatinous silica; which is capable of operation as a continuous process without frequent shut-down for removal of accumulated gelatinous silica or other materials which might interfere with fluid flow; which results in the production of a phosphoric acid of sufficient purity to enable use instead of the more expensive acid produced by the combustion of phosphorus; and which makes use of low cost and readily available materials and conventional equipment to produce a low cost, high yield purification process.

In accordance with the practice of this invention, an anion of boron is introduced into the liquid slurry of impure phosphorus obtained from the treatment of phosphate rock with sulphuric acid. The resulting material is filtered to remove solids and the filtrate is treated with a water immiscible organic solvent for the phosphoric acid for solvent separation of phosphoric acid from the slurry and from which the phosphoric acid can be eluted or removed by contact with water with the recycle of the water immiscible organic solvent in the solvent separation step.

Solvent separation of phosphoric acid by the water immiscible solvent can be effected by passing the organic solvent in countercurrent flow with the solute elution of the phosphoric acid from the organic solvent can also be effected by countercurrent flow between the water and the water immiscible organic solvent having the phosphoric acid dissolved therein with the return of the organic solvent to the solvent separation step after phosphoric acid has been removed by contact with water.

The mechanism by which the desirable effect is achieved from the presence of the anions of boron in the slurry has not yet been established. It is noted that fluosilica acid and polysilicic acids are both present with the impure phosphoric acid in the slurry and that condensation of such fluosilicic acid and polysilicic acids is prevented in the presence of the boric anions sufficiently to avoid gel formation thereby to make it possible to carry out the purification process without frequent interruptions of the type heretofore experienced. It is believed that the presence of the boric ion operates to maintain a part of the total silica in a state which is easily separated by filtration while the remainder of the ion is effective to prevent condensation of polysilicic acids.

The phosphoric acid which is purified by the process described will be found to contain anions of sulphur, silicon, boron and fluorine but these do not present obstacles to the preparation of phosphate derivatives, such as alkaline phosphates, particularly disodium or trisodium phosphate, in which further purification can be achieved in response to crystal formation. The purified acid obtained in accordance with the practice of this invention can be freed of accompanying anions by other well known separation techniques, such as the ion exchange with complex amines, precipitation of insoluble salts, and the like, to enable other uses to be made of the purified phosphoric acid and derivatives thereof.

The invention will be illustrated by the following example, which is given by way of illustration but not by way of limitation. The example will define a continuous process in which the various operations are carried out with the materials at a temperature of about 50° C. It will be understood that the process can be conducted as a batch operation and that use can be made of other suitable temperatures, preferably of at least 50° C.

In the example, use is made of an untreated phosphoric acid containing 35% $P_2O_5$ which has been derived from the treatment of phosphate rock (apatite of Togo) by treatment with sulphuric acid and which has been filtered and which contains the following impurities based upon the amount of $P_2O_5$:

|    | P.p.m. |       | Percent |
|----|--------|-------|---------|
| Al | 4,700  | $SO_4$ | 4.2     |
| Fe | 18,200 | F     | 3.7     |
| Cr | 228    |       |         |
| Hg | 2,140  | $SiO_2$ | 2.2   |

Finely divided boric acid is added with mixing to the untreated phosphoric acid in an amount corresponding to 4 kg. of boric acid per cubic meter of the untreated phosphoric acid and contact is maintained therebetween for ½ hour.

The precipitated silica is removed by continuous filtration and the solute is passed in countercurrent flow with tributylphosphate at a rate of one volume of solute per two volumes of tributylphosphate. For this purpose use is made of a three-stage contact tower. The aqueous phase issuing as one product will contain 50% of the phosphoric acid in an impure solution in which the phosphoric acid is present in an amount corresponding to 27% $P_2O_5$. This latter phase can be concentrated and used to supply the phosphate component of a commercial fertilizer.

The organic phase of tributylphosphate will contain the remainder of the phosphoric acid extracted by solution. The organic phase, having the phosphoric acid dissolved therein, is passed in countercurrent flow with water using one part by volume of the organic phase to ½ part by volume of water. For this purpose use is made of a six-stage contact tower. The resulting water phase will contain phosphoric acid in a concentration of about 28% $P_2O_5$ along with the following impurities based upon the amount of $P_2O_5$:

|    | P.p.m. |       | Percent |
|----|--------|-------|---------|
| Al | ≤88    | $SO_4$ | 1      |
| Fe | 310    | F     | 2.2     |
| Cr | ≤2     |       |         |
| Hg | ≤70    | $SiO_2$ | 1.5   |
| B  | 1,400  |       |         |

The tributylphosphate from which the purified phosphoric acid has been eluted by the water phase can be recycled to the first step for passage again in countercurrent flow with impure phosphoric acid. Thus the tributylphosphate functions as an intermediate carrier to effect removal of purified phosphoric acid by solution from the raw material containing the impure phosphoric acid for delivery of the phosphoric acid separated by solution to the water phase. It is preferred to effect purification of the tributylphosphate before recycle, as by treatment with a molar solution of caustic soda. Such purification can be carried out by reaction of .2 volume of tributylphosphate, as effluent, with 0.1 volume of the molar solution of caustic soda. The tributylphosphate which has been yellowed by the organic matter extracted with the impure acid solution is decolorized by the caustic soda and the caustic soda operates to neutralize polysilicic acids to form corresponding sodium silicates which might find their way into the solution of tributylphosphate and which might otherwise form into a silica gel.

It is possible to modify or to complete the process described in the example by various means within the scope of the invention. For example, instead of mixing the boric acid with the filtered impure phosphoric acid, the boric acid can be introduced directly into the slurry before filtration.

Instead of making use of boric acid in the example, use can be made of other soluble compounds of boron from which the anion can be readily released upon solution in the aqueous medium containing the impure phosphoric acid.

By way of further modification, the aqueous phase remaining after solvent separation by passage in countercurrent flow with the tributylphosphate can be concentrated and treated again with tributylphosphate for further extraction of additional amounts of purified phosphoric acid thereby to increase the yield of the purified product.

It is preferred to make use of tributylphosphate as the organic solvent because it is a readily available and low cost material. However, it will be understood that other water immiscible organic solvents can be employed in which phosphoric acid finds preferential solubility and which may have the same drawbacks as tributylphosphate, reference being made to the formation of silica gel in the absence of the anion of boric acid in the initial slurry or filtered product thereof.

Before treatment, the impure phosphoric acid can be exposed by contact with activated carbon for decolorization before solvent extraction to purify the phosphoric acid component.

By way of still further modification, it will be understood that the number of stages in the extraction tower may be varied and that the levels at which the liquids are admitted to the different stages can also be varied.

It will be understood that further changes may be made with respect to the ratio of materials and amounts used for extraction purposes and the means for making contact between the materials for extraction without departing from the spirit of the invention, especially as defined in the following claims.

We claim:

1. In the process for purification of phosphoric acid by solvent extraction from an impure phosphoric acid solution resulting from the treatment of phosphate rock with sulphuric acid, the steps of adding anions of boron to the impure phosphoric acid solution in amount sufficient to prevent formation of gelatinous silica, contacting the impure phosphoric acid solution with a water immiscible organic solvent in which the phosphoric acid is soluble to extract phosphoric acid from the impure phophoric acid solution by solvent separation, and contacting the water immiscible organic solvent containing phosphoric acid dissolved therein with water to extract purified phosphoric acid from the water immiscible organic solvent.

2. The process as claimed in claim 1 which includes the step of filtering the impure phosphoric acid solution after the anion of boron has been added.

3. The process as claimed in claim 1 in which the contact between the impure phosphoric acid solution and the water immiscible organic solvent is carried out in a continuous operation by countercurrent flow.

4. The process as claimed in claim 1 in which the contact between the water immiscible organic solvent containing the phosphoric acid dissolved therein and the water is carried out as a continuous operation with the materials in countercurrent flow.

5. The process as claimed in claim 1 in which the anions of boron are introduced as boric acid.

6. The process as claimed in claim 1 in which the water immiscible organic solvent is tributylphosphate.

7. The process as claimed in claim 1 in which the materials are maintained at a temperature of at least 50° C. during the processing steps.

8. The process as claimed in claim 1 which includes the step of recycling the water immiscible organic solvent from the water extraction step to the solvent extraction step.

9. The process as claimed in claim 8 which includes the step of treating the water immiscible organic solvent with caustic soda after the water extraction step for purification of the solvent before recycling to the solvent extraction step.

10. The process as claimed in claim 1 which includes the steps of concentrating the impure phosphoric acid solution after contact with the water immiscible organic solvent and contacting the concentrate with another increment of the water immiscible organic solvent for extraction of additional amounts of phosphoric acid.

11. The process as claimed in claim 1 which includes the step of treating the impure phosphoric acid solution with activated carbon before contacting with the water immiscible organic solvent.

12. The process as claimed in claim 1 in which the contact between the impure phosphoric acid solution and the water immiscible organic solvent is in the ratio of about one part by volume of the impure phosphoric acid solution to two parts by volume of the water immiscible organic solvent.

References Cited

UNITED STATES PATENTS

| | | | |
|---|---|---|---|
| 2,929,777 | 3/1960 | Clavenger | 23—165 X |
| 3,072,461 | 1/1963 | Long et al. | 23—165 |
| 3,084,027 | 4/1963 | Hollingsworth et al. | 23—165 |
| 3,186,793 | 6/1965 | Gillis et al. | 23—165 |
| 3,298,782 | 1/1967 | Archambault | 23—165 |

OSCAR R. VERTIZ, *Primary Examiner.*

A. GREIF, *Assistant Examiner.*